United States Patent

[11] 3,633,099

[72] Inventor Russell B. Richman
 Richland, Wash.
[21] Appl. No. 837,818
[22] Filed June 30, 1969
[45] Patented Jan. 4, 1972
[73] Assignee The United States of America as
 represented by the Secretary of the Interior

[54] PROCESS AND APPARATUS FOR DETERMINING CREVICE CORROSION BY POLARIZATION TECHNIQUES
 7 Claims, 3 Drawing Figs.

[52] U.S. Cl. .................................................. 324/71 C,
 23/253 C, 204/1 T
[51] Int. Cl. ....................................................... G01n 27/00
[50] Field of Search ........................................... 324/65, 71;
 204/1, 195; 338/13; 23/230, 253; 73/86

[56] References Cited
 UNITED STATES PATENTS

| | | | |
|---|---|---|---|
| 1,181,440 | 5/1916 | Edgecomb.................... | 174/152.4 |
| 3,222,920 | 12/1965 | Marsh ......................... | 73/86 |
| 3,418,848 | 12/1968 | Schaschl...................... | 73/86 |
| 3,436,320 | 4/1969 | Marsh ......................... | 204/1 |

*Primary Examiner*—Michael J. Lynch
*Attorneys*—Ernest S. Cohen and Roland H. Shubert ABSTRACT: Crevice corrosion is detected and its extent is qualitatively measured by use of a two-electrode, polarization-type probe. The two electrodes are fabricated of the same metal and have substantially equal surface areas. At least one of the electrodes is shaped to define a crevice area of relatively narrow width. The crevice area may be formed by cutting or milling a slot in the electrodes, by grooving or threading the electrodes or by encircling the electrodes with a sleevelike element of a nonconducting material.

PATENTED JAN 4 1972  3,633,099

INVENTOR
RUSSELL B. RICHMAN
BY Ernest S. Cohen
Roland H. Shubert
ATTORNEYS

PROCESS AND APPARATUS FOR DETERMINING CREVICE CORROSION BY POLARIZATION TECHNIQUES

BACKGROUND OF THE INVENTION

A great deal of experimental work has been done to develop techniques and apparatus relating polarization curves to the corrosion of metals. Polarization curves generally are a representation of the changes in specimen potential caused by externally applied current. Probably the simplest experimental technique is the galvanostatic or constant current method in which a current is passed between the corroding electrode and an auxiliary electrode; usually of platinum. Current is measured by use of milliammeter and potential is measured against a third, or reference electrode.

An adaptation of this general procedure has become a well-established laboratory method for determining the instantaneous corrosion rate of metals. In the laboratory method, a small current ( I) is passed through a metal specimen. The current and potential change ($\Delta E$) in the specimen are measured. The ratio of $\Delta E$ to $\Delta I$, termed the polarization resistance, has been found to be inversely proportional to the instantaneous corrosion current which in turn is proportional to the instantaneous corrosion rate of the metal specimen. A more detailed illustration of this procedure may be found in an article by Skold et al. appearing in *Corrosion*, v. 13, n. 2, pages 139t–142t, Feb. 1957.

This laboratory method is difficult to use in routine industrial measurements because a reference electrode and precise electrode potential data are required. These difficulties have been largely overcome by the development of a test probe having two identical electrodes, one of the electrodes taking the place of the usual reference electrode. Corrosion current as determined by this system, is a function of the conductivity of the electrolyte and of the valence of the corroding ion going into solution. Electrolyte conductivity can be readily measured and valence of the corroding ion may be predicted from a knowledge of chemistry and of the system being studied. Hence, a correction factor may be determined for each system being studied.

The dual electrode probe is used by applying a small potential, usually on the order of 20 millivolts or less, between the two electrodes. Current flowing between the two electrodes is measured and this value is given the designation A. Polarity is then reversed and a second current B is measured. The average of these two currents, (A+B)/2, is then adjusted by a correction factor determined for the system under study and this adjusted current is then proportional to the instantaneous corrosion rate. If the current values (A and B) are nearly the same, then the electrodes are at essentially equal potential and corrosion of the two electrodes in uniform. A difference in the two current values indicates the electrodes are at different potentials and that nonuniform attack or pitting is occuring. The greater the difference between the two currents, the more intense is the nonuniform or pitting attack. This difference cannot be translated into a quantitative measure of pitting depth but has proved to be a very useful tool for the qualitative detection and measurement of nonuniform corrosion.

SUMMARY OF THE INVENTION

It has now been found that crevice corrosion can be detected and qualitatively measured by use of a special type of two-electrode polarization probe. Crevice corrosion is a specific type of pitting attack typically occurring at welds, joints and surface imperfections in a metal exposed to a corrosive environment. By providing a particular type of electrode structure, it is possible to instantaneously detect, continuously monitor and differentiate crevice corrosion from other types of pitting corrosion.

One embodiment of the probe comprises one solid electrode and one slotted electrode. Diameters and lengths of the electrodes are adjusted to provide approximately equal-exposed surface areas. A second embodiment uses nonconducting beads encircling one or both electrodes to provide an annular-type crevice. Yet another embodiment provides threads or grooves on one or both of the polarization electrodes; the length, diameter or groove geometry being adjusted to provide substantially equal surface areas.

Hence it is an object of this invention to provide means for determining crevice corrosion by polarization techniques.

It is another object of this invention to provide polarization probes adapted to distinguish between crevice corrosion and other types of nonuniform corrosion.

A specific object of this invention is to detect the onset and qualitatively determine the intensity of crevice corrosion.

DETAILED DESCRIPTION OF THE INVENTION

The invention will be described in greater detail by reference to the drawings in which.

Figure 1:
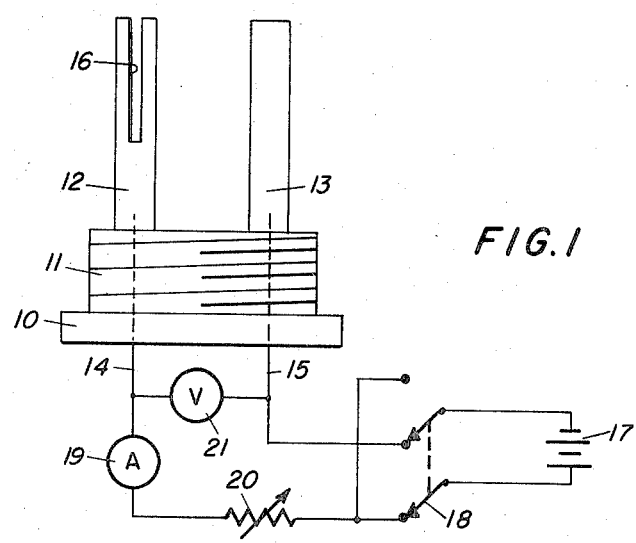
FIG. 1 is a schematic representation showing one form of apparatus and electrical measuring circuit of this invention.

Referring now to the drawings, the same numerical designation is used with the same part or parts of the apparatus wherever applicable. In FIG. 1 there is shown one embodiment of the two-electrode test probe together with a schematic representation of an electrical circuit suitable for use with the probe.

The test probe comprises a base portion 10 which may be threaded at 11 for convenient installation in a standard fitting. Base 10 may be fabricated of any appropriate material, including plastics and metals, so long as electrodes 12 and 13 together with their respective electrical leads 14 and 15 are maintained in electrical isolation relative to the base and to each other.

Electrodes 12 and 13 may be of any appropriate shape, but are conveniently circular in cross section and have a length on the order of 1 to 6 inches. Both electrodes are constructed of the same metal or alloy and are mounted in a fixed relationship on base 10. Either or both of the electrodes are provided with a slot-type crevice 16. The slot may be formed by cutting the electrode part way either longitudinally or transversely so as to form a crevice region. Alternatively, the crevice may be formed by machining half-electrodes, either with a taper, a step, or a series of steps so as to form a crevice region when the two halves are joined together. Joining may be accomplished metallurgically or by use of an electrically conductive adhesive. Sizes of the finished electrode are adjusted so that each electrode initially displays substantially the same surface area to a test environment. Width of the slot or crevice may vary in the general range of about 2 to about 50 mils.

In operation, the probe is mounted on a test apparatus so that electrodes 12 and 13 are immersed in the test fluid. Onset and intensity of crevice corrosion is monitored and determined using the electrical measuring circuit illustrated in the figure. In that circuit, potential source 17, which may comprise a battery, is connected to polarity-reversing switch 18. Electrical leads 14 and 15 are connected to switch 18 in the manner shown so as to allow reversal of circuit polarity by operation of the switch. Connected in series with lead 14 is ammeter 19 and variable resistance 20. Voltmeter 21 is connected across leads 14 and 15 so as to measure electrode potential.

A small potential, on the order of 20 mv. or less, is applied through the circuit across the two electrodes. The resulting current is read from ammeter 19 and this value is given the arbitrary designation A. Switch 18 is then thrown reversing the polarity of the circuit. A second resulting current is read on ammeter 19 and is given the designation B. If current A is substantially equal to current B, then essentially no crevice corrosion is occurring on the electrodes. If, however, the two currents differ, then crevice corrosion is occurring. The greater the difference between the two currents, the more intense is the crevice attack. This relationship is a qualitative rather than a quantitative measure of corrosive intensity.

As may be seen, the disclosed process and apparatus provides means for readily monitoring the corrosive properties of liquids within a closed or semiclosed system such as a processing vessel or chemical reactor. Use of the probe on a continuous basis in processes such as water desalting can give early warning of apparatus damage or system failure. Conversely, probe data may be used to adjust process conditions to avoid excessive crevice corrosion.

Figure 2:
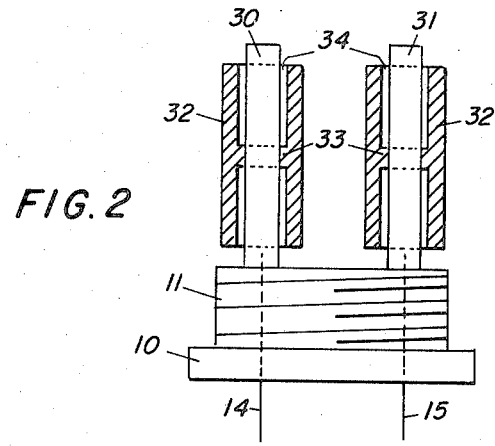
FIG. 2 is a partial sectional view of a two-electrode probe constructed in accordance with the invention.
Figure 3:
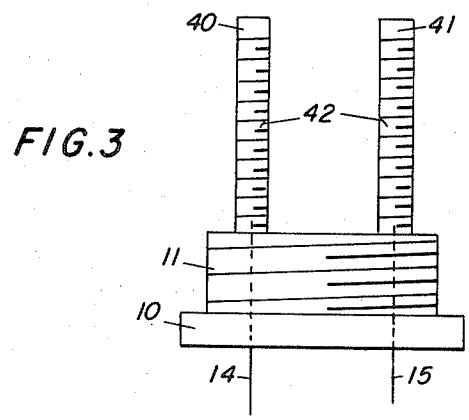
FIG. 3 is another embodiment of the two-electrode probe.

Referring now to FIGS. 2 and 3, there are shown additional embodiments of the probe structure. In FIG. 2, electrodes 30 and 31 preferably comprise identical metallic rods. Mounted on at least one and preferably both electrodes are nonconducting crevice-forming members 32. These members, shown in section, comprise one or more nonconducting beads of ceramic, plastic or similar materials. Each bead has one or more sections 33 closely fitting the electrode so as to support and center the bead on the electrode. Other interior sections of the bead are enlarged to form a generally annular crevice 34 around the electrode. The interior of the bead may be formed in a step to provide a crevice of uniform width as is shown; may be formed in a series of steps to provide a series of different crevice widths or may be tapered to form a continuously varying crevice width. Positive access of environmental fluids into the crevice may be assured by drilling or slotting the beads. Positive placement of the beads on the electrodes may be assured by providing a shrink fit between section 33 and the electrode. Other retaining means may be used including setscrews, retaining rings and the like.

Referring now to FIG. 3, electrodes 40 and 41 are mounted as before on base 10. These electrodes preferably comprise rods or tubes of circular cross section and are fabricated of the same metal. One or preferably both of the electrodes is threaded or grooved 42 over a substantial portion of its length. These threads or grooves provide a series of crevice areas which are exposed to environmental fluids. Again, it is important that each electrode displays substantially the same exposed surface area. In those cases where the electrodes are threaded, a mating nut or collar (not shown), fabricated of a nonconducting material, may be installed over the threaded electrode area. By providing a loose fit between electrode and collar, an extensive crevice area of controlled width may be formed.

The embodiments of the invention illustrated by FIGS. 2 and 3 are utilized in the same manner as that illustrated in FIG. 1. It is readily evident that a variety of other structural arrangements of the probe electrode may be provided to accomplish substantially the same result. Similarly, a number of equivalent circuit arrangements will be obvious to those skilled in the art.

What is claimed is:

1. A device for the detection and measurement of crevice corrosion by polarization techniques which comprises:
   a. a pair of elongated electrodes fabricated of the same metal, each of the electrodes having substantially equal surface areas and at least one of the electrodes being provided with an extended crevice area, said extended crevice area formed by a sleevelike member nonconductive to electricity encircling a portion of at least one of the electrodes to define an extended crevice area between the member and the electrode;
   b. a base member supporting the electrodes in a fixed physical relationship for exposure to a test environment, the base member maintaining the electrodes in electrical isolation from each other and from the base member;
   c. electrical conducting members communicating between a terminal point of each electrode and a point external to the test environment, and
   d. electrical means, adapted to produce a signal representative of corrosion onset and intensity, operably connected to said conducting members.

2. The device of claim 1 wherein said electrical means comprise means for impressing a known potential across the electrodes and measuring means to determine magnitude of current flow across the electrodes resulting from the impressed potential.

3. The device of claim 1 wherein the member nonconductive to electricity comprises at least one beadlike element surrounding a major portion of at least one of the electrodes, said electrode generally cylindrical shape, and forming in cooperation with the electrode an annular crevice.

4. The device of claim 3 wherein the beadlike element is axially pierced to form a bore extending through the element a portion of the bore substantially conforming in diameter to the diameter of the electrode and the remaining portion of the bore having a diameter greater than that of the electrode so as to form a crevice having a width in the range of about 2 to about 50 mils.

5. The device of claim 2 wherein the extended crevice region is formed by grooving at least one of the electrodes over a substantial portion of its length.

6. The device of claim 5 wherein said grooving comprises threading and wherein a threaded collar fabricated of a nonconductive material providing a loose mating fit with the electrode forms in cooperation with the electrode an extended crevice region of controlled width.

7. A device for the detection and measurement of crevice corrosion by polarization techniques which comprises:
   a. a pair of elongated electrodes fabricated of the same metal, each of the electrodes having substantially equal surface areas and at least one of the electrodes being provided with an extended crevice area, said extended crevice area formed by threading at least one of the electrodes over a substantial portion of its length and wherein a threaded collar fabricated of a nonconductive material providing a loose mating fit with the electrode forms in cooperation with the electrode an extended crevice region of controlled width;
   b. a base member supporting the electrodes in a fixed physical relationship for exposure to a test environment, the base member maintaining the electrodes in electrical isolation from each other and from the base member;
   c. electrical conducting members communicating between a terminal point of each electrode and a point external to the test environment, and
   d. electrical means, adapted to produce a signal representative of corrosion onset and intensity, operably connected to said conducting members.

* * * * *